March 27, 1956
G. J. BOUYOUCOS
2,740,032
ELECTRIC HYGROMETER
Filed April 8, 1954
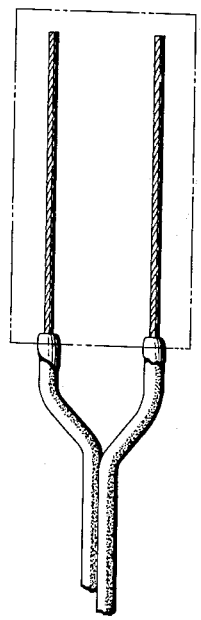
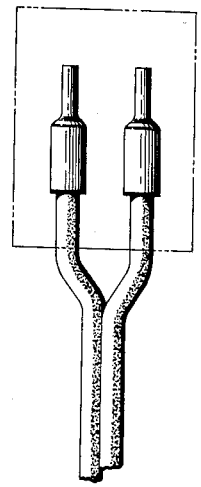
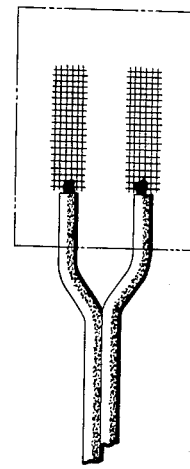
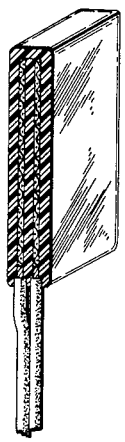
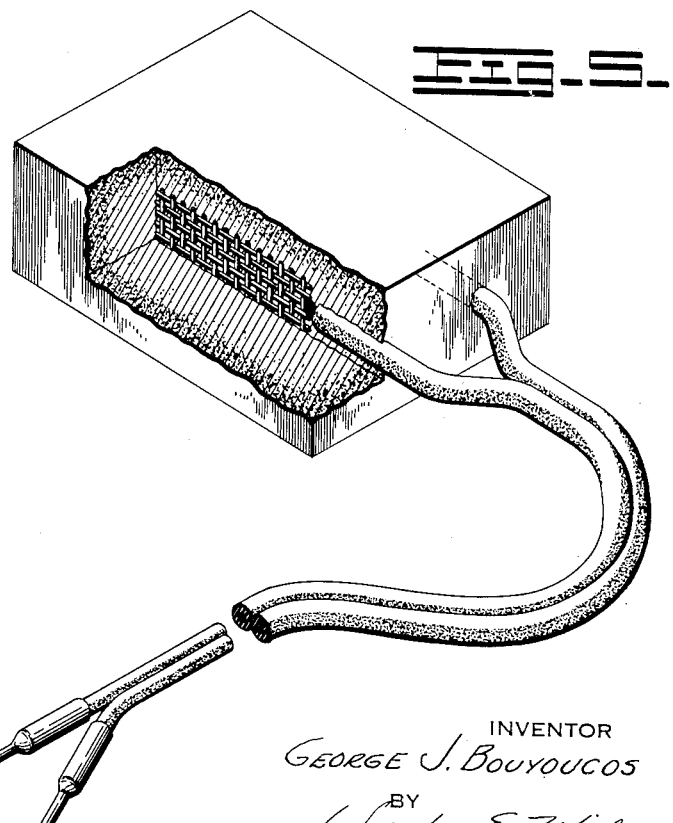
INVENTOR
GEORGE J. BOUYOUCOS
BY
ATTORNEY

United States Patent Office 2,740,032
Patented Mar. 27, 1956

2,740,032

ELECTRIC HYGROMETER

George J. Bouyoucos, East Lansing, Mich.

Application April 8, 1954, Serial No. 421,979

8 Claims. (Cl. 201—63)

The present invention relates to an improved absorption unit used in electrical resistance apparatus for determination of the moisture content of soils.

A variety of devices have been suggested as soil moisture meters, the most satisfactory of which has been an electrical resistance device utilizing plaster of Paris blocks as the water absorption units. The operation of these meters is guided by several well-defined principles. First, the plaster of Paris blocks because of their unique physical and chemical properties serve as absorption units when placed directly in the ground, and equilibrium between the moisture in the soil and the moisture in the block or cast is quite readily established. Dual electrodes are embedded in the block and are connected to various resistance measuring units, the electrical resistance of the absorption unit varying with the amount of moisture that it contains. Thus, the moisture content of the absorption block determines its electrical resistance and such relationship remains fairly constant if there are no appreciable changes in the electrolyte content of the blocks. Finally, changes in the electrical resistance of the block indicate changes in moisture content of the block and thus determine moisture changes in soil in direct contact with such absorption units. By appropriate calibration of the soil moisture meters, moisture contents may be ascertained directly in a quantitative manner in terms of percentage of total water, or indirectly or qualitatively in terms of electrical resistance (ohms).

Electrical resistance measuring instruments, chiefly modified Wheatstone bridges, impedance meters and the like have been used in measuring the resistance of the selected water absorption blocks or casts. Where large variances in resistance of the absorption unit are encountered, a high-frequency oscillator, e. g., a vacuum tube connected to a current source, may be used in conjunction with the resistance measuring instruments. Alternating current is the electrical source customarily used with the electrical resistance measuring units since the use of direct current may lead to undesirable polarization and electrolysis effects.

In use, the absorption unit of the soil moisture meter is placed in the ground at the point at which the moisture content is to be determined and the resistance of the absorption unit then measured periodically, care being taken to record only the resistance measurement taken after the moisture of the soil and the moisture of the absorption unit are at equilibrium. The percentage of the moisture in the soil is then determined from the electrical resistance, as explained above.

U. S. Patent 2,636,962 illustrates a typical soil moisture meter employing a modified Wheatstone bridge resistance unit and a novel water absorption unit fabricated from alternate layers of closely woven nylon fibers as the dielectric and open-mesh stamped nickel or stainless steel screens as electrodes, the electrodes and dielectrics being enclosed within a perforated metal case. Equilibrium in the water absorption unit is achieved by moisture transfer from the ground through the pores of the fabric which are small enough to serve as capillaries.

While the plaster of Paris block absorption units have found wide commercial usage, their life-span under quite wet field conditions is very short, e. g., less than one year, due to dissolution and disintegration of the gypsum components. In well-drained soils, the plaster of Paris blocks have been successfully used for somewhat greater periods of time. As the blocks disintegrate and the metal electrodes become exposed to the soil, the accuracy of moisture meter diminishes rapidly and the original calibration of the instrument is no longer constant.

Therefore, it is an object of the present invention to provide an improved absorption unit for soil moisture meters embodying electrical resistance principles.

It is an additional object of the present invention to provide an improved plaster absorption block or cast.

Another object of the present invention is to provide a plaster of Paris absorption block impregnated with a substantially water insoluble but water permeable resin binder.

An additional object of the present invention is to provide a resin impregnated plaster of Paris block having a dual electrode system embedded therein that in itself has water absorption properties.

These and other objects of the present invention will become apparent to one skilled in the art to which this invention pertains.

In the drawings:

Figure 1 illustrates a block in phantom line having a dual electrode system comprising two tinned copper electrodes.

Figure 2 illustrates a block in phantom line having a dual electrode system comprising two thick metal tip electrodes.

Figure 3 illustrates a block in phantom line having a dual electrode system comprising two wire screen electrodes.

Figure 4 illustrates dual electrode system having wire screen electrodes shown in Figure 3, separated by woven nylon mesh fabric for encasement in an open metal case; and Figure 5 illustrates in perspective view a resin impregnated plaster block with a cutaway portion showing a dual electrode system in place and lead in wires to the electrode.

The present invention is a novel absorption unit adapted for use in electrical resistance apparatus for measuring soil moisture content and comprises a plaster block impregnated with a substantially water insoluble but water absorptive resin, the block having embedded therein a dual electrode system (Figure 5). It has been found that by impregnating a plaster absorption block with the appropriate resin that a durable, more efficient moisture absorption block can be provided. The life of a plaster of Paris water absorption block has been prolonged tremendously by impregnation with the appropriate resin. The dual electrode system embedded in the block may consist of either twisted tinned copper wire cables per se (Figure 1) or short, thick metal tips soldered to the appropriate leads (Figure 2), or even self-contained moisture absorption units (Figure 4), such as a thin unit formed from wire screen electrodes (Figure 3) separated by woven nylon mesh fabric as dielectrics, the entire unit being held together in an open metal case (Figure 4). This latter dual electrode system alone has been employed as a moisture absorption unit without incasement in plaster of Paris (see U. S. Patent 2,636,962). Other conventional dual electrode systems can be employed and will yield satisfactory resistance measurements when embedded in the resin impregnated plaster blocks. Finally, either alternating or direct current can be used as a current source for the electrical resistance measuring units employed with the novel absorption blocks or casts.

The castings or blocks are formed from plasters, preferably plaster of Paris, although certain clays and cements may be employed, and are to be included with the term, "plaster" as used throughout this specification. Gypsum, comprising chiefly calcium sulfate in various forms, is the preferred casting material from which the blocks are prepared. Preferably, the gypsum is first calcined to yield a hemihydrate salt ($CaSO_4.\frac{1}{2}H_2O$) and the resulting calcined material mixed and agitated with the appropriate amount of water to form an admixture of suitable consistency for use in the mold or die. Plasters formed from sand, lime and water, and various other gypsum and limestone cements, as well as plasters formed from mineral clays such as western and southern bentonites have been found operable. Other clays, such as fire-clays, kaolinites and certain diatomaceous materials have been employed in the formation of the water absorption block or casting although blocks cast from these latter materials are not operative over as a wide a moisture range as the preferred plaster of Paris blocks. Plaster of Paris because of its tendency to expand upon hardening forms a preferred electrode interface, the blocks holding up to 68 percent of their dry weight of water. Equilibrium between the soil moisture and the absorption block moisture is readily achieved because of the advantageous pore size of the hardened plaster of Paris block that permits rapid capillary moisture action.

Resins or binding agents used in impregnating the plaster blocks must be carefully selected and in general should possess substantial water insolubility while at the same time exhibiting definite water absorption qualities. The resin, when cured, must prolong the life of the block, must not appreciably change the physical or chemical characteristics, and must be applicable to the block in a solvent that is not detrimental to either the electrodes or the block material itself. While there are several resins possessing operative characteristics, the polyamide resins are preferred. For example, the linear resins, formed from the condensation of dibasic acids with diamines, e. g., polyhexamethyleneadipamide (nylon), of sufficiently high molecular weight to be capable of filament formation can be employed as well as those linear polyamide resins formed by the self-condensation of amino acids. Among the nylons, certain of the molding powders and soluble nylon resins are particularly useful. These resins are characterized by their solubility in lower alkanols, particularly methanol and ethanol and by their high water absorption characteristics, i. e., up to 2.5 percent and above by weight as measured by the standardized procedure of determination of water retention after soaking a standard $\frac{1}{8}$ inch thick disc in water for a 24 hour period of time. Comparable inoperative resins exhibit water retention of only about 0.5 percent under similar conditions. Alkanol soluble nylon resins No. FM-6501 (DuPont) and FM-6503 (DuPont) are preferred resin embodiments. Other soluble nylon resins that are substantially water insoluble but possess poor moisture absorption qualities have been tried unsuccessfully. Other polyamide and polyester resins that are substantially water insoluble but permeable to water and water vapor can be satisfactorily employed, especially wherein the cross-linking agents are the polyamines having active hydrogen groups. Further, epoxy resins, formed from the condensation of polyolphenols with chlorohydrin materials, when cross-linked with polyfunctional amines yield satisfactory resins under conditions wherein only minimum amounts of electrolytes are present in the resins. Resins, such as calcium acrylate and various melamine resins, are not operable since, upon curing, they may leave residues that interfere with the electrical resistance properties of the plaster block. Resins requiring heating substantially in excess of about 75° centigrade in order to cure are unsuited since the preferred plaster of Paris blocks when subjected to such temperatures may lose their bound water of crystallization content causing certain of the calcium sulfate components to go into solution with the result that the electrical resistance of the absorption units becomes insensitive to changes of moisture within the blocks. Furane resins, while not as satisfactory as the preferred nylon resins, are also operative.

In applying the resin impregnating or bonding agent, the completed and cured plaster casting or block is preferably suspended in a solution of the chosen resin for a period of time, determined empirically, sufficient to deposit the required resin solids. For example, a plaster of Paris block suspended in a 6 percent nylon (FM-6503) resin solution consisting of 85 parts of ethanol and 15 parts of water will gain 1½ percent by weight of dry resin solids in about 30 minutes time.

Solvents such as alcohols, water, ketones and the like that do not react with the electrodes embedded in the plaster casts or with the plaster components themselves are preferred. Chlorinated solvents, on the other hand, are not generally desirable. After the block has been suspended in the resin solution for the desired period of time, the impregnated block is dried and/or cured at room temperature or at temperatures short of the point at which interference occurs with the water of crystallization or other constituents of the block. Under certain conditions, it is desirable to incorporate the resin or resin solution with the wet plaster in the mold during the casting operation, i. e., formation of the plaster of Paris block, but the impregnation is better controlled and there is less chance of reactivity with the plaster components in the preferred procedure of impregnating after pre-forming completely the cast or block having the electrode system embedded therein. Also, a better casting of the calcined gypsum with water is accomplished if there is no solvent or resin present to interfere with the action of the water or the gypsum.

An amount of resin solids generally in excess of about ½ percent by weight of the dried and cured absorption block is incorporated in order to achieve the marked increase of durability and other improved features of the unit but if too large amounts of resin solids are present in the block or if the resin is not sufficiently water absorptive, an impervious barrier may be formed that prevents the rapid attainment of equilibrium conditions between the moisture absorption unit and the moisture of the surrounding soil or ground. Amounts of deposited resin impregnant of greater than about 10 percent by weight of the finished block have proven in some instances to have deleterious effects on the functioning of the absorption unit.

The following examples illustrate the novel moisture absorption units of the present invention but are not to be construed as limiting.

*Example 1.—Resin impregnated plaster of Paris absorption unit*

An absorption unit comprising a dielectric material of woven nylon fabric positioned between opposing sides of two electrodes fabricated from stainless steel was prepared according to the procedure illustrated in U. S. Patent 2,636,962 (Figures 1 and 2). The electrodes were cemented to the dielectric components adjacent the periphery of the latter. A pair of leads was silver soldered to the electrodes. An additional piece of woven nylon fabric was placed on each of the outer sides of the two electrodes and the entire unit, comprising three nylon sheets and two electrodes, was enclosed in a rectangular shaped metal case fabricated from stainless steel screen. Insulated conductors were provided for connecting the absorption unit to the resistance measuring unit.

An accurately machined mold about 1¾ by 1⅜ by ⅝ inches in dimension was prepared and the case containing the nylon sheets separating the metal electrodes was suspended in the mold in a position so as to maintain a constant distance between the case and the surfaces of the mold. A plaster of Paris composition, comprising an admixture of calcined gypsum ($CaSO_4 \cdot 1/2H_2O$) with water and possessing sufficient fluidity to pour well, was cast around the case firmly suspended in the mold. After the plaster of Paris composition had "set up" the casting was permitted to stand at about room temperature until cured and was then removed from the mold.

A polyamide resin (nylon molding powder DuPont FM–6503) solution was prepared by admixing 60 parts by weight of resin in about 1000 parts by weight of 85 percent ethanol. The resulting admixture was maintained at between 150° and 160° F. with continual agitation until the solid resin was dissolved. The cured plaster of Paris block having the nylon-electrode unit embedded therein was suspended in the resin solution for a period of 25 minutes and thereafter air dried for a period of about 30 hours. To enhance curing of the resin, the impregnated units were subjected to alternate wetting with distilled water and drying during the 30 hour period.

Quantitative weighing of the absorption unit before and after the impregnation with the resin indicated a gain in weight of resin solids of approximately 1.65 percent.

The completed absorptive unit comprising the inner metal electrode-nylon dielectric system encased in the resin impregnated plaster of Paris block was connected via the insulated conductors to the fourth leg of a modified Wheatstone bridge resistance measuring unit of the type described in U. S. Patent 2,636,962 and the moisture content of a variety of soils determined by periodic measurements of the resistance of the absorption unit under moisture equilibrium conditions with the soil in contact with the block, the resistance of the unit varying inversely with the amount of moisture present in the absorption block.

*Example 2.—Resin impregnated plaster of Paris absorption unit*

A water absorptive unit was prepared by casting the electrodes directly in the plaster of Paris block. The electrodes, consisting of short, thick metal tips spaced about 3/16 of an inch apart were soldered to the lead wires (copper cables) with a rosin solder and the joint sealed with a resin paint. The metal tips serving as the electrodes were then embedded in a plaster of Paris composition similar to that utilized in Example 1, and upon subsequent drying and curing, the plaster of Paris absorption block was removed from the mold.

The block was suspended in the 6 percent by weight polyamide resin (nylon FM–6501) in 95 percent methanol solution for a period of about 40 minutes and the resulting resin impregnated block dried and cured at a temperature of about 75 degrees Fahrenheit. About 2 percent of the weight of the completed block consisted of the polyamide resin material.

Following the procedure of Example 1, the resin-impregnated absorption block was connected to a modified impedance electrical resistance measuring unit and the percentage of water in soils of varying moisture content determined.

*Example 3.—Resin impregnated plaster of Paris absorption unit*

Following the general procedure of Examples 1 and 2 an absorptive plaster of Paris block of 1¾ by 1⅜ by ⅝ inch dimensions was prepared by embedding directly in the fluid plaster of Paris two tinned twisted copper wire electrodes extending substantially the length of the mold, followed by a hardening and curing of the plaster of Paris composition.

The block was impregnated by suspension in a 3 percent furane resin in acetone solution, followed by drying and curing of the impregnated block at a temperature slightly below 100° C. Slightly more than 1 percent by weight of resin solids was thus added to the cast. The block was satisfactorily employed with moisture meter apparatus, using direct current as the electrical source, for soil moisture determinations, the impregnated block tending to be somewhat more impervious to water than the blocks of Examples 1 and 2, and, consequently, a greater period of time was required for the moisture absorption unit to reach electro-moisture equilibrium with the surrounding soil.

Comparative tests of resin treated blocks with untreated blocks under simulated field moisture conditions were conducted and very enhanced durability of the treated casts or blocks was observed. In such tests, treated and untreated blocks were suspended in a ten gallon jar and tap water permitted to flow continuously into and out of the jar over a period of at least 5 days, the temperature of the water remaining at about 50° F. The dissolution rate of plaster of Paris (gypsum), was known to be appreciably greater in cold water than in warm water and the continuous flow provided a unidirectional mass reaction of the dissolution of the gypsum without permitting at any time the attainment of equilibrium conditions. Quantitative weight tests showed that the untreated blocks lost between 75 and 90 percent of their original weight while the treated resin blocks lost a maximum of 2 percent by weight under precisely the same conditions.

It was further observed under actual field testing that the buffer action of the plaster of Paris cast, the rate and amount of water absorption, and the electrical conductivity and sensitivity to moisture variations remained unimpaired in the resin impregnated blocks. While initially the electrical resistance of the treated blocks was slightly higher, the electro-moisture equilibrium conditions were nevertheless rapidly obtained and the treated blocks were found to be more sensitive to soil moisture changes than the untreated blocks, thereby permitting determination of a greater range, i. e., by up to 2 percent, of soil moisture content.

Performance of the treated blocks under actual soil conditions was shown to correspond precisely with that of the untreated blocks and resulting comparisons of curves obtained by plotting the logarithm of resistance in ohms against percentage of soil moisture produced almost identical curves (although the curve for the resin treated blocks indicated a performance over a greater range of percent of soil moisture) revealed that the fundamental principles underlying the use of the absorption blocks with electrical resistance measuring meters were undisturbed by the presence of the resin binder or impregnant in the blocks.

The unique absorption unit formed from woven nylon fabric positioned between metal electrodes as described in Example 1, formed a moisture absorption unit in itself that is extremely sensitive to soil moisture changes but the outer metal case of the unit tended to interfere with the requisite contact between the soil and the closely woven nylon material serving as the water absorbing medium. At low moisture content, the contact was especially poor due to the drying and shrinking of the soil away from the unit. When such a unit is embedded in the plaster cast, as shown in Example 1, and the dried and cured cast impregnated with a suitable resin, an unusually effective water absorption unit is produced, the plaster casting imparting to the nylon unit an excellent outer contact surface, thereby eliminating the previous disadvantage. Further, the moisture equilibrium between the nylon unit and the soil is appreciably enhanced by the intermediate plaster of Paris casting material, which further serves to act as a buffer in modifying the salt effects of the soil. This buffer action was, of course, lacking previously in the nylon type absorption unit. As a result of the use of the novel resin impregnated blocks, direct current may now be employed with the resistance measuring units for the majority of applications. Lower cost, direct current moisture determination meters for use on farms have been provided. Therefore, in the present invention, the preferred dual electrode system is the nylon-electrode unit (U. S. Patent 2,636,962) that is embedded in a resin impregnated plaster cast to provide a moisture absorption unit for use whenever the ultimate in accuracy of moisture measurement is desired. Moisture meters utilizing either direct or alternating current can be used. However, the moisture absorption units comprising plaster casts having the dual electrode systems illustrated in Examples 2 and 3 and the other conventional electrode systems are very satisfactory for the majority of applications, where extreme accuracy of soil moisture determination is not required.

Various modifications may be made in the invention without departing from the spirit or scope thereof, and it is to be understood that the invention is limited only as defined in the appended claims.

I claim:

1. In an electrical resistance apparatus for measuring soil moisture content, an improved absorption unit comprising a plaster block impregnated with a substantially water insoluble but water absorptive resin, said block having embedded therein a dual electrode system.

2. In an electrical resistance apparatus for measuring soil moisture content, an improved absorption unit comprising a plaster of Paris block impregnated with a substantially water insoluble but water absorptive polyamide resin, said block having embedded therein a dual electrode system.

3. In an electrical resistance apparatus for measuring soil moisture content, an improved absorption unit comprising a plaster of Paris block impregnated with a substantially water insoluble but water absorptive nylon resin, said block having embedded therein a dual electrode system.

4. In an electrical resistance apparatus for measuring soil moisture content, an improved absorption unit comprising a plaster block impregnated with a substantially water insoluble but water absorptive resin, said block having embedded therein a dual electrode system comprising a pair of electrodes and a relatively thin dielectric layer interposed between said electrodes and in contact therewith, said dielectric layer being composed of closely woven nylon fibers.

5. In an electrical resistance apparatus for measuring soil moisture content, an improved absorption unit comprising a plaster block impregnated with a substantially water insoluble but water absorptive resin, said block having embedded therein a dual electrode system comprising a pair of electrodes, a relatively thin dielectric layer interposed between said electrodes and in contact therewith and relatively thin dielectric layers located outside of said electrodes and entirely enclosing the same, said dielectric layers being composed of closely woven nylon fibers.

6. In an electrical apparatus for measuring soil moisture content, an improved absorption unit comprising a plaster block impregnated with a substantially water insoluble but water absorptive resin, said block having embedded therein a dual electrode system comprising two metal electrodes.

7. In an electrical resistance apparatus for measuring soil moisture content, an improved absorption unit comprising a plaster block impregnated with a substantially water insoluble but water absorptive nylon resin, said block having embedded therein a dual electrode system comprising a pair of electrodes and a relatively thin dielectric layer interposed between said electrodes and in contact therewith, said dielectric layer being composed of closely woven nylon fibers.

8. In an electrical apparatus for measuring soil moisture content, an improved absorption unit comprising a plaster block impregnated with a substantially water insoluble but water absorptive nylon resin, said block having embedded therein a dual electrode system comprising two metal electrodes.

References Cited in the file of this patent

UNITED STATES PATENTS

| 2,367,561 | Bouyoucos | Jan. 16, 1945 |
| 2,636,962 | Bouyoucos | Apr. 28, 1953 |